US012181808B2

(12) United States Patent
Suzuki

(10) Patent No.: US 12,181,808 B2
(45) Date of Patent: Dec. 31, 2024

(54) CLEANING DEVICE AND IMAGE FORMING APPARATUS INCORPORATING SAME

(71) Applicant: Michiharu Suzuki, Kanagawa (JP)

(72) Inventor: Michiharu Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/219,712

(22) Filed: Jul. 10, 2023

(65) Prior Publication Data

US 2024/0027939 A1 Jan. 25, 2024

(30) Foreign Application Priority Data

Jul. 20, 2022 (JP) ................................ 2022-115724

(51) Int. Cl.
*G03G 15/16* (2006.01)
*G03G 21/00* (2006.01)

(52) U.S. Cl.
CPC ....... *G03G 15/161* (2013.01); *G03G 21/0011* (2013.01); *G03G 21/0035* (2013.01); *G03G 21/0076* (2013.01); *G03G 2215/1661* (2013.01); *G03G 2221/001* (2013.01)

(58) Field of Classification Search
CPC ............ G03G 15/161; G03G 21/0011; G03G 21/0035; G03G 21/0076
USPC .................. 399/98–101, 123, 353, 357–359
See application file for complete search history.

(56) References Cited

U.S. PATENT DOCUMENTS

| | | | | |
|---|---|---|---|---|
| 8,682,208 | B2 * | 3/2014 | Asaoka | G03G 15/161 399/101 |
| 2018/0335721 | A1 | 11/2018 | Koike et al. | |
| 2019/0227479 | A1 | 7/2019 | Suzuki et al. | |

FOREIGN PATENT DOCUMENTS

| | | |
|---|---|---|
| JP | 2013-057703 | 3/2013 |
| JP | 2015-230432 | 12/2015 |
| JP | 2018-197766 | 12/2018 |
| JP | 2019-128413 | 8/2019 |
| JP | 2019-152810 | 9/2019 |

* cited by examiner

*Primary Examiner* — Hoan H Tran
(74) *Attorney, Agent, or Firm* — XSENSUS LLP

(57) ABSTRACT

A cleaning device includes multiple cleaners, a partition, and a holder. The multiple cleaners include a first cleaner and a second cleaner adjacent to the first cleaner. The multiple cleaners each include a cleaning roller to remove a substance adhering to a surface of an object and a housing having an opening to collect the substance. The partition partitions the first cleaner and the second cleaner and defines a part of a wall of each of the first cleaner and the second cleaner. The holder holds the multiple cleaners.

18 Claims, 4 Drawing Sheets

CLEANING DEVICE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2022-115724, filed on Jul. 20, 2022, in the Japan Patent Office, the entire disclosure of which is hereby incorporated by reference herein.

BACKGROUND

Technical Field

Embodiments of the present disclosure relate to a cleaning device and an image forming apparatus incorporating the cleaning device.

Related Art

One type of image forming apparatus such as a copier or a printer includes a cleaning device, for example, a cleaning device to remove toner adhering to an intermediate transfer belt or the like.

SUMMARY

This specification describes an improved cleaning device that includes multiple cleaners, a partition, and a holder. The multiple cleaners include a first cleaner and a second cleaner adjacent to the first cleaner. The multiple cleaners each include a cleaning roller to remove a substance adhering to a surface of an object and a housing having an opening to collect the substance. The partition partitions the first cleaner and the second cleaner and defines a part of a wall of each of the first cleaner and the second cleaner. The holder holds the multiple cleaners.

This specification also describes an image forming apparatus including the cleaning devices.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
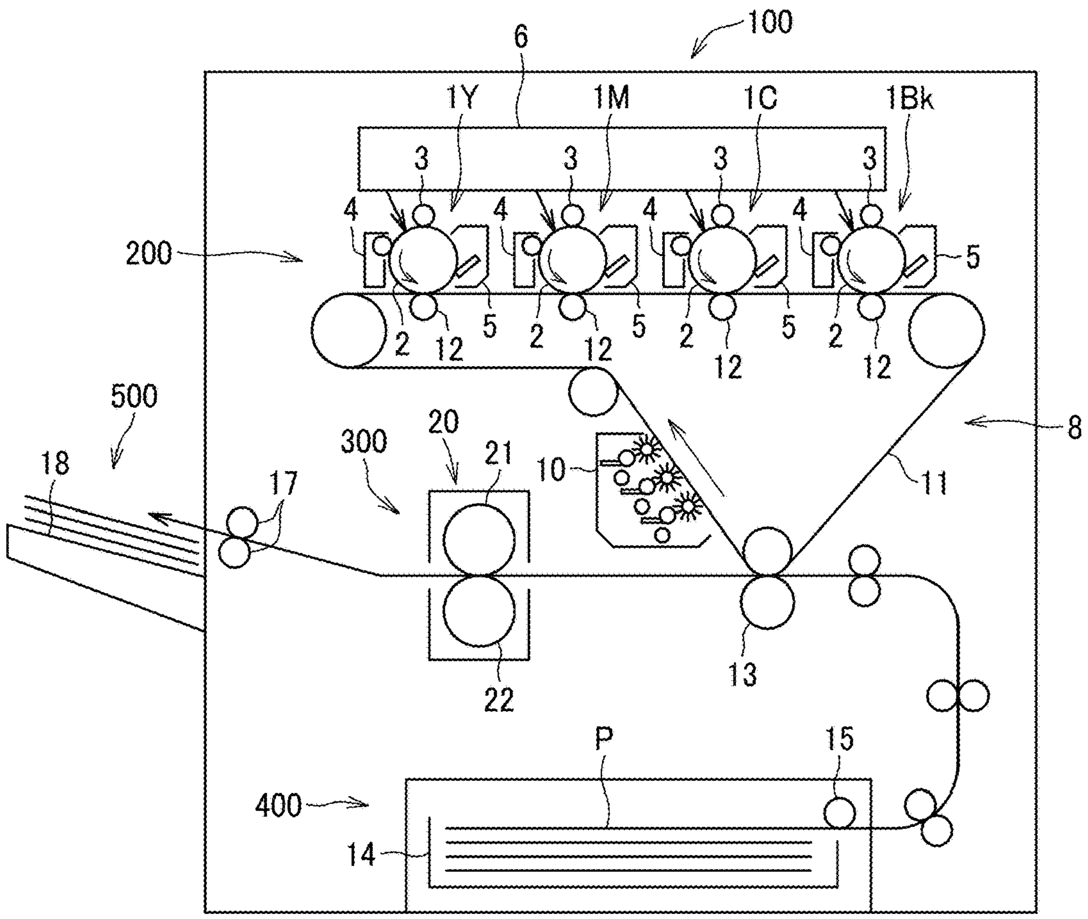
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

With reference to drawings, descriptions are given below of embodiments of the present disclosure. In the drawings for illustrating embodiments of the present disclosure, elements or components identical or similar in function or shape are given identical reference numerals as far as distinguishable, and redundant descriptions are omitted.

FIG. 1 is a schematic cross-sectional view of an image forming apparatus 100 according to an embodiment of the present disclosure. In the following description, the “image forming apparatus” includes a printer, a copier, a scanner, a facsimile machine, or a multifunction peripheral having at least two of printing, copying, scanning, and facsimile functions. The term “image formation” indicates an action for providing (i.e., printing) not only an image having a meaning, such as texts and figures on a recording medium, but also an image having no meaning, such as patterns on the recording medium. Initially, with reference to FIG. 1, a description is given of an overall configuration and operation of the image forming apparatus 100 according to the embodiment of the present disclosure.

As illustrated in FIG. 1, the image forming apparatus 100 according to the present embodiment includes an image forming section 200 to form an image on a sheet-shaped recording medium such as a sheet, a fixing section 300 to fix the image onto the recording medium, a recording medium feeder 400 to feed the recording medium to the image forming section 200, and a recording medium ejection section 500 to eject the recording medium to an outside of the image forming apparatus 100.

The image forming section 200 includes four process units 1Y, 1M, 1C, and 1Bk as image forming units, an exposure device 6 to form an electrostatic latent image on a photoconductor 2 in each of the process units 1Y, 1M, 1C, and 1Bk, and a transfer device 8 to transfer an image onto the recording medium.

The process units 1Y, 1M, 1C, and 1Bk have the same configuration except for containing different color toners (developers), i.e., yellow (Y), magenta (M), cyan (C), and black (Bk) toners, respectively, corresponding to decomposed color separation components of full-color images. Specifically, each of the process units 1Y, 1M, 1C, and 1Bk includes the photoconductor 2 serving as an image bearer bearing the image on the surface thereof, a charger 3 to charge the surface of the photoconductor 2, a developing device 4 to supply the toner as the developer to the surface of the photoconductor 2 to form a toner image, and a photoconductor cleaning device 5 to clean the surface of the photoconductor 2.

The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip. The transfer device 8 also includes a belt cleaning device 10 that cleans the surface of the intermediate transfer belt 11.

The fixing section 300 includes a fixing device 20. The fixing device 20 includes a fixing rotator 21 and a pressure rotator 22. A heat source such as a heater heats the fixing rotator 21. The pressure rotator 22 is pressed against the fixing rotator 21 to form a fixing nip.

The recording medium feeder 400 includes a sheet tray 14 as a sheet container to store sheets P as recording media and a feed roller 15 to feed the sheet P from the sheet tray 14. Although a "recording medium" is described as a "sheet of paper" (simply referred to as "sheet") in the following embodiments, the "recording medium" is not limited to the sheet of paper. Examples of the "recording medium" include not only the sheet of paper but also an overhead projector (OHP) transparency sheet, a fabric, a metallic sheet, a plastic film, and a prepreg sheet including carbon fibers previously impregnated with resin. Examples of the "sheet" include thick paper, a postcard, an envelope, thin paper, coated paper (e.g., coat paper and art paper), and tracing paper, in addition to plain paper.

The recording medium ejection section 500 includes an output roller pair 17 to eject the sheet P to the outside of the image forming apparatus 100 and an output tray 18 to place the sheet P ejected by the output roller pair 17.

To provide a fuller understanding of the embodiments of the present disclosure, a description is now given of printing operations of the image forming apparatus 100 according to the present embodiment, with continued reference to FIG. 1.

When the image forming apparatus 100 starts the printing operations, the photoconductors 2 of the process units 1Y, 1M, 1C, and 1Bk and the intermediate transfer belt 11 of the transfer device 8 start rotating. The feed roller 15 starts rotating to feed the sheet P from the sheet tray 14. The sheet P fed from the sheet tray 14 is brought into contact with a timing roller pair 16 and temporarily stopped until the image forming section 200 forms the image to be transferred to the sheet P.

In each of the process units 1Y, 1M, 1C, and 1Bk, the charger 3 uniformly charges the surface of the photoconductor 2 at a high electric potential. Next, the exposure device 6 exposes the surface (that is, the charged surface) of each photoconductor 2 based on image data of a document read by a document reading device or print image data sent from a terminal that sends a print instruction. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming the toner image thereon.

When the toner images formed on the photoconductors 2 reach the primary transfer nips defined by the primary transfer rollers 12 with the rotation of the photoconductors 2, the toner images formed on the photoconductors 2 are transferred onto the intermediate transfer belt 11 rotated clockwise in FIG. 1 successively such that the toner images are superimposed on the intermediate transfer belt 11, forming a full color toner image thereon. Thus, the full color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred from each of the photoconductors 2 onto the intermediate transfer belt 11, each of photoconductor cleaning devices 5 removes residual toner on each of the photoconductors 2.

In accordance with the rotation of the intermediate transfer belt 11, the toner image transferred onto the intermediate transfer belt 11 is conveyed to the secondary transfer nip (the position of the secondary transfer roller 13) and is transferred onto the sheet P conveyed by the timing roller pair 16. The residual toner on the intermediate transfer belt 11 that has not been transferred to the sheet P is removed by the belt cleaning device 10.

The sheet P bearing the toner image is conveyed to the fixing device 20. The sheet P enters the fixing nip between the fixing rotator 21 and the pressure rotator 22. In the fixing device 20, the fixing rotator 21 and the pressure rotator 22 apply heat and pressure to the toner image on the sheet P to fix the toner image onto the sheet P.

Subsequently, the sheet P bearing the fixed toner image is conveyed to the recording medium ejection section 500. In the recording medium ejection section 500, the output roller pair 17 ejects the sheet P onto the output tray 18. Thus, a series of printing operations is completed.

Next, a schematic configuration and a basic operation of the belt cleaning device according to the present embodiment are described with reference to FIG. 2.

Figure 2:
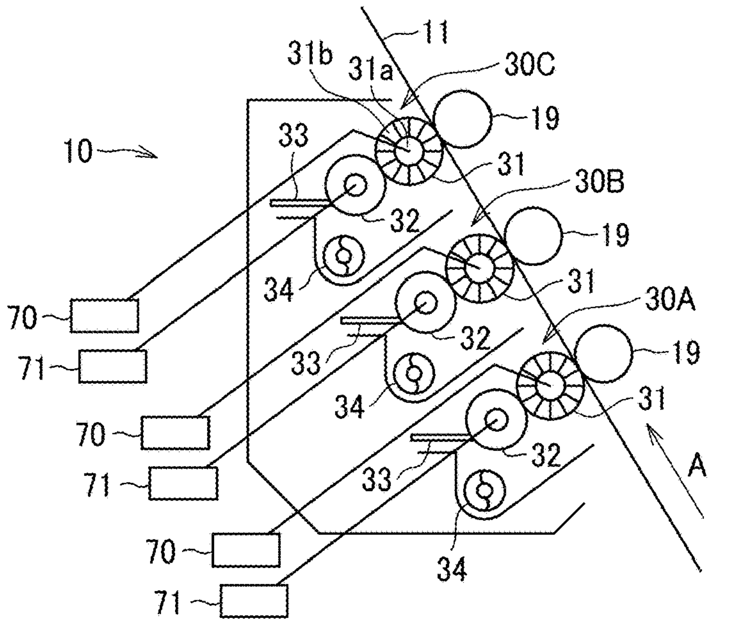
FIG. 2 is a schematic view of a configuration of a cleaning device to clean a belt according to the embodiment.

As illustrated in FIG. 2, the belt cleaning device 10 according to the present embodiment includes three cleaners 30A, 30B, and 30C. The cleaners 30A, 30B, and 30C are arranged side by side in the moving direction A of the intermediate transfer belt 11 as an object to be cleaned.

Each of the cleaners 30A, 30B, and 30C includes a cleaning brush roller 31, a collection roller 32, a scraping blade 33, and a conveying screw 34.

The cleaning brush roller 31 is a cleaning roller to remove, from the intermediate transfer belt 11, foreign matter as substances such as residual toner and other matter adhering to the surface of the intermediate transfer belt 11. The cleaning brush roller 31 is disposed so as to contact the outer circumferential surface of the intermediate transfer belt 11. The outer circumferential surface of the intermediate transfer belt is a toner image bearing surface. A cleaning backup roller 19 is disposed to contact an inner circumferential surface of the intermediate transfer belt 11 at a position facing the cleaning brush roller 31 contacting the outer circumferential surface of the intermediate transfer belt 11. The cleaning brush roller 31 includes a rotatably supported metal rotation shaft 31*a* and a brush 31*b* formed by multiple raised fibers on an outer peripheral surface of the rotation shaft 31*a*. The raised fibers each have, for example, a double-layered core sheath structure in which the inner side thereof is made of a conductive material such as conductive carbon and the surface portion thereof is made of an insulating material such as polyester. A power source 70 as a voltage applying device applies a predetermined voltage to the rotation shaft 31*a* of the cleaning brush roller 31.

The collection roller 32 as a collector contacts the cleaning brush roller 31 and rotates to collect the residual toner from the cleaning brush roller 31. In the present embodiment, the potential gradient between the cleaning brush roller 31 and the collecting roller 32 causes electrostatic transfer of the residual toner from the cleaning brush roller 31 to the collecting roller 32. The collection roller 32 is made of, for example, steel use stainless (SUS). A power source 71 as a voltage applying device applies a predetermined voltage to the collection roller 32.

The scraping blade 33 as a scraper comes into contact with the collection roller 32 and scrapes the residual toner from the surface of the collection roller 32. The scraping blade 33 is configured by, for example, an elastic body such as a plate made of SUS and having a thickness of about 0.1 mm, a plate made of urethane rubber and having a thickness of about 1.5 mm to 3 mm, or the like.

The conveying screw 34 as a conveyor conveys the residual toner scraped off by the scraping blade 33 to a toner storage or the like outside the cleaners 30A, 30B, and 30C. The conveying screw 34 rotates to convey the residual toner in an axial direction that is a direction orthogonal to the paper surface of FIG. 2.

Most of the residual toner adhering to the intermediate transfer belt 11 is charged to a polarity opposite to the normal charge polarity of the toner. For example, when the normal charging polarity of the toner is a negative polarity, the residual toner is charged to a positive polarity opposite to the negative polarity.

For this reason, the power source 70 in the present embodiment applies a voltage as a cleaning bias having the same polarity as the normal charge polarity of the toner to the cleaning brush roller 31 as a first cleaning roller in the first cleaner 30A located on the most upstream side among the three cleaners 30A, 30B, and 30C to remove the residual toner charged to the polarity opposite to the normal charge polarity of the toner from the intermediate transfer belt 11. In other words, the cleaning brush roller 31 charged to the same polarity as the normal charge polarity of the toner electrostatically attracts the residual toner charged to the polarity opposite to the normal charge polarity of the toner from the intermediate transfer belt 11.

The rotation of the cleaning brush roller 31 moves the residual toner having the opposite polarity and being attracted to the cleaning brush roller 31 to a contact position at which the cleaning brush roller 31 contacts the collection roller 32. The collection roller 32 electrostatically collects the residual toner having the opposite polarity. For example, the power source 71 applies, to the collection roller 32, a voltage as a collecting bias having an absolute value larger than the absolute value of the cleaning bias applied to the cleaning brush roller 31. The cleaning bias and the collecting bias each have the negative polarity. The difference between the cleaning bias and the collecting bias generates a potential gradient (that is, an electric field) between the cleaning brush roller 31 and the collecting roller 32. The potential gradient electrostatically transfers the residual toner from the cleaning brush roller 31 to the collection roller 32. The residual toner collected by the collection roller 32 is scraped off from the surface of the collection roller 32 by the scraping blade 33, and the conveying screw 34 conveys the residual toner to the toner storage.

The above-described first cleaner 30A removes the residual toner charged to the opposite polarity that is most of the residual toner on the intermediate transfer belt 11. However, the residual toner on the intermediate transfer belt 11 includes the toner having the normal charge polarity. For this reason, the second cleaner 30B and the third cleaner 30C disposed downstream from the first cleaner 30A in the present embodiment remove the residual toner charged to the normal charge polarity.

Specifically, the power source 70 applies a voltage as a cleaning bias having the polarity opposite to the normal charge polarity to the cleaning brush roller 31 as a second cleaning roller in the second cleaner 30B. As a result, the cleaning brush roller 31 in the second cleaner 30B electrostatically captures and removes the residual toner having the normal charge polarity from the intermediate transfer belt 11. The collection roller 32 collects the residual toner captured by the cleaning brush roller 31. For example, the power source 71 applies, to the collection roller 32 in the second cleaner 30B, a voltage as a collecting bias having an absolute value larger than the absolute value of the cleaning bias applied to the cleaning brush roller 31 in the second cleaner 30B. The cleaning bias and the collecting bias for the second cleaner 30B each have the positive polarity. As a result, the residual toner is electrostatically transferred from the cleaning brush roller 31 to the collection roller 32. The residual toner collected by the collection roller 32 is scraped off from the surface of the collection roller 32 by the scraping blade 33, and the conveying screw 34 conveys the residual toner to the toner storage.

Subsequently, the third cleaner 30C downstream from the second cleaner 30B removes the residual toner having the normal charge polarity which has not been removed by the second cleaner 30B. Specifically, the power source 70 applies a voltage as a cleaning bias having the polarity opposite to the normal charge polarity to the cleaning brush roller 31 as a third cleaning roller in the third cleaner 30C, and the cleaning brush roller 31 in the third cleaner 30C electrostatically captures the residual toner. In the same manner as described above, the residual toner captured by the cleaning brush roller 31 is electrostatically transferred to the collection roller 32. The scraping blade 33 scrapes off the residual toner from the collection roller 32, and the conveying screw 34 conveys the residual toner to the toner storage.

As described above, the residual toner on the intermediate transfer belt 11 is sequentially conveyed to the multiple cleaners 30A, 30B, and 30C, and the cleaners 30A, 30B, and 30C in the present embodiment can satisfactorily remove the residual toner from the intermediate transfer belt 11.

However, the residual toner on the intermediate transfer belt 11 may drop from the intermediate transfer belt 11 between adjacent cleaners. If any of the cleaners does not collect the dropped toner, the toner is scattered around the belt cleaning device 10 and contaminates the inside of the image forming apparatus, which may cause an abnormal image.

Figure 8:
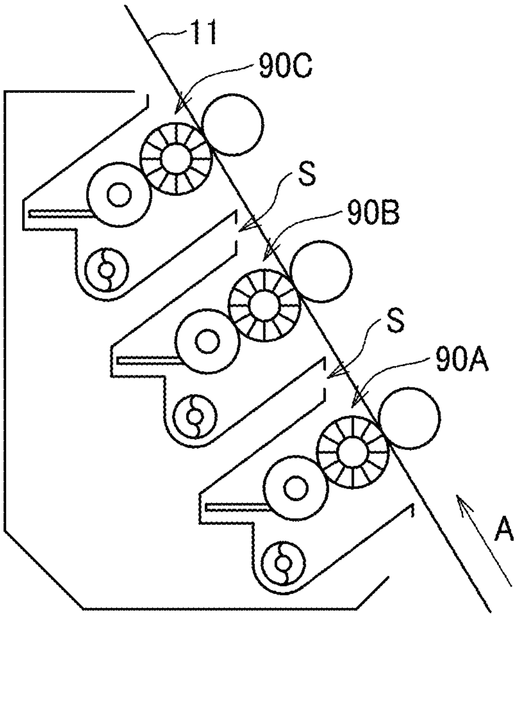
FIG. 8 is a schematic view of a configuration of a cleaning device to clean a belt, according to a comparative embodiment.

For example, a belt cleaning device illustrated in FIG. 8 includes multiple cleaners 90A, 90B, and 90C arranged side by side in the moving direction A of the intermediate transfer belt 11 at intervals S between adjacent cleaners. The residual toner may drop from the intermediate transfer belt 11 to the outside of the cleaners through the interval S between the adjacent cleaners and be scattered around the belt cleaning device.

The belt cleaning device in the present embodiment has the following configuration to reduce the scattering of the toner from the interval between the cleaners. Hereinafter, the embodiment of the present disclosure is describe.

Figure 3:
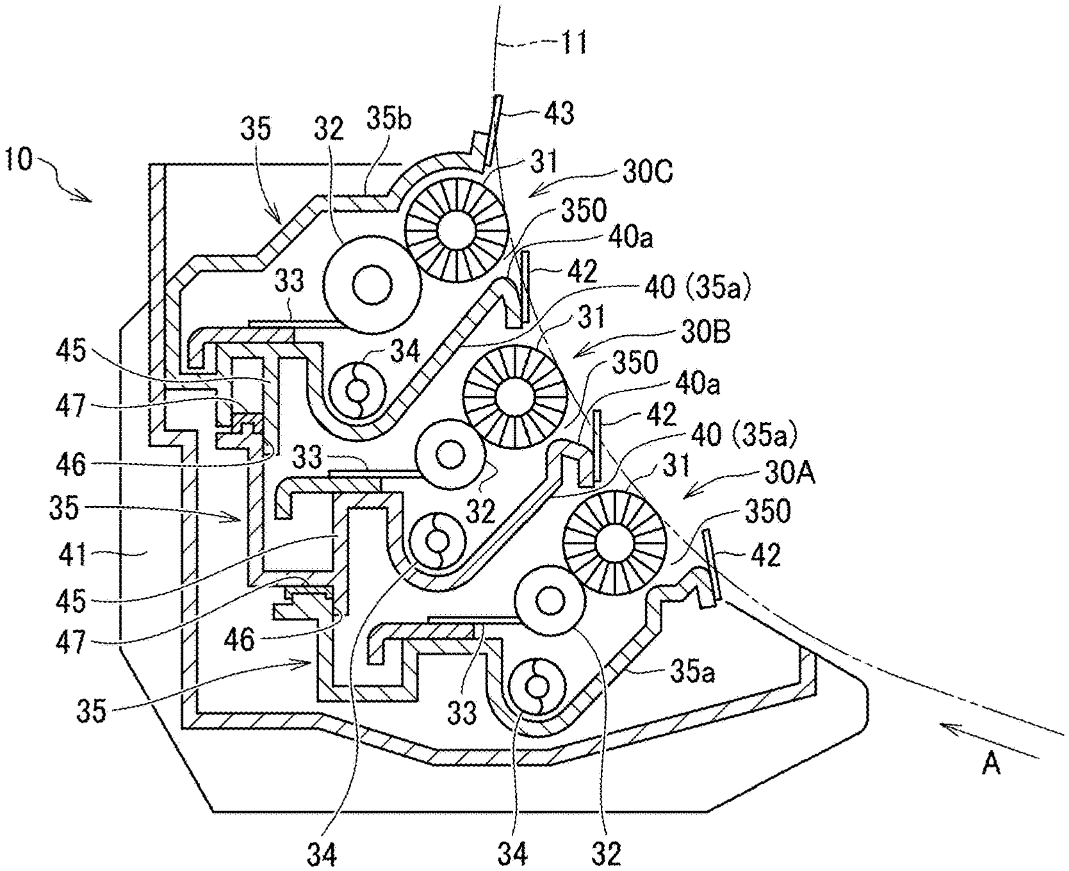
FIG. 3 is a cross-sectional view of the cleaning device of FIG. 2.
Figure 4:
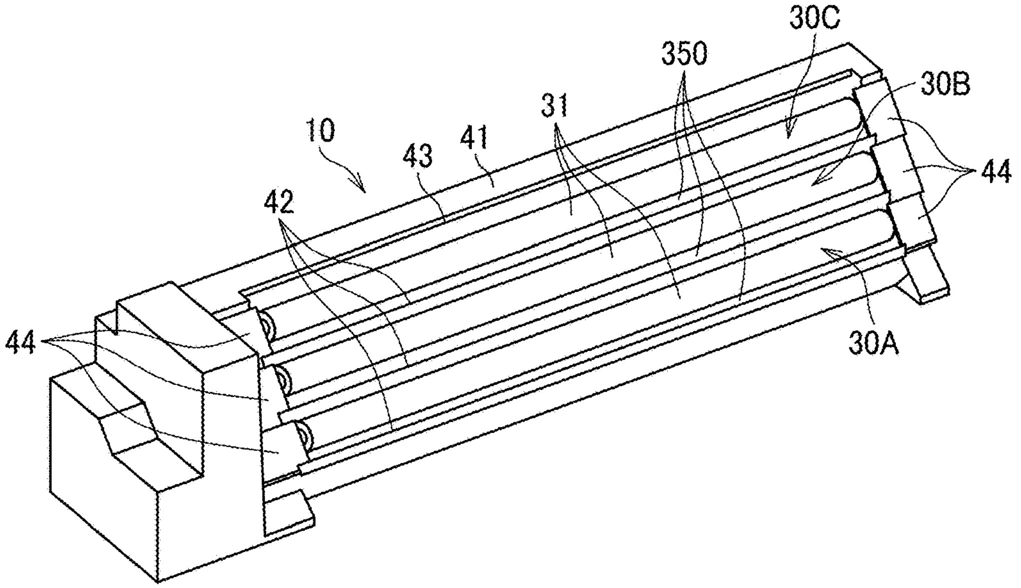
FIG. 4 is a perspective view of the cleaning device of FIG. 2.

FIG. 3 is a cross-sectional view of the belt cleaning device according to the present embodiment. FIG. 4 is a perspective view of the belt cleaning device according to the present embodiment.

As illustrated in FIG. 3, the belt cleaning device 10 according to the present embodiment includes multiple cleaners 30A, 30B, and 30C and a holder 41 to hold the cleaners 30A, 30B, and 30C. Each of the cleaners 30A, 30B, and 30C is configured to be attachable to and detachable from the holder 41.

Each of the cleaners 30A, 30B, and 30C includes the cleaning brush roller 31, the collection roller 32, the scraping blade 33, the conveying screw 34, and a housing 35 to accommodate these components. Each housing 35 has an opening 350 opposite the outer circumferential surface of the intermediate transfer belt 11. The cleaning brush roller 31 is disposed in the opening 350. When the cleaning brush roller 31 removes, from the intermediate transfer belt 11, the foreign matter as the substances such as residual toner and other matter adhering to the intermediate transfer belt 11, the removed residual toner passes through the opening 350 and is collected into the housing 35.

Each of the cleaners 30A, 30B, and 30C includes an entrance seal 42 disposed on the upstream side of the housing in each of the cleaners 30A, 30B, and 30C in the moving direction A in which the intermediate transfer belt 11 moves. The upstream side defines a part of the opening 350 in each of the cleaners 30A, 30B, and 30C. In addition, the cleaner 30C as a most downstream cleaner disposed most downstream of the cleaners 30A, 30B, and 30C in the moving direction A includes an outlet seal 43 disposed on the downstream side of the housing of the cleaner 30C in the moving direction A. The downstream side defines the most downstream opening 350 among the openings 350. Additionally, as illustrated in FIG. 4, each of the cleaners 30A, 30B, and 30C includes side seals 44 disposed at both sides of the cleaners 30A, 30B, and 30C in the longitudinal direction that is a direction orthogonal to the moving direction A. The both sides are adjacent to both sides of the opening 350. The entrance seals 42, the outlet seal 43, and the side seals 44 are disposed so as to be in contact with the outer circumferential surface of the intermediate transfer belt 11 to seal gaps between the sides of the cleaners 30A, 30B, 30C and the intermediate transfer belt 11 so that the toner collected in the housing 35 does not scatter from the openings 350 to the outside of the housing 35.

In the present embodiment, the cleaners 30A, 30B, and 30C are assembled so as to overlap each other in the vertical direction. As illustrated in FIG. 3, one partition 40 is interposed between the cleaners adjacent to each other after the cleaners 30A, 30B, and 30C are assembled.

The partition 40 is a part of a bottom plate 35*a* of the housing 35 of the cleaner disposed above the other cleaner, and the cleaner and the other cleaner are adjacent to each other (in other words, overlapping each other). In this specification, the other cleaner is referred to as a lower cleaner or a first cleaner, and the cleaner disposed above the other cleaner is referred to as an upper cleaner or a second cleaner. The partition 40 functions as a ceiling plate covering the upper portion of the lower cleaner. That is, the bottom plate 35*a* of the housing 35 of the upper cleaner functions as the ceiling plate of the lower cleaner. Accordingly, the housings 35 of the cleaners 30A and 30B other than the third cleaner 30C disposed at the uppermost side does not have the ceiling plate, and the housing 35 of only the third cleaner 30C disposed at the uppermost side includes a ceiling plate 35*b* (see FIG. 3). The housings 35 of the cleaners 30A, 30B, and 30C include bottom plates 35*a.*

As described above, in the present embodiment, the bottom plates of the cleaners 30B and 30C as the upper cleaners (and the second cleaners) function as the upper plates of the cleaners 30A and 30B as the lower cleaners (and the first cleaners), respectively. The bottom plate includes the one partition 40. That is, the one partition 40 serves as the bottom plate of the second cleaner and functions as the ceiling plate of the first cleaner, and therefore the first cleaner does not include the ceiling plate. Alternatively, the one partition 40 may serve as the ceiling plate of the first cleaner and function as the bottom plate of the second cleaner, and therefore the second cleaner may not include the bottom plate. In both cases, the partition 40 partitions the first cleaner and the second cleaner and defines a part of a wall of each of the first cleaner and the second cleaner. As a result, there is no clearance between the openings 350 adjacent to each other.

The belt cleaning device illustrated in FIG. 8 has intervals S between the cleaners, but the cleaning device in the present embodiment does not have the interval S. As a result, the above-described structure can prevent the toner from entering the interval between the adjacent cleaners. For this reason, the above-described structure according to the present embodiment can reduce the scattering of the toner to the outside of the cleaners, decrease the contamination of the inside of the image forming apparatus due to the scattered toner, and prevent the occurrence of the abnormal image. In addition, the conveying screw 34 of the upper cleaner is disposed above the lowest part of the one partition 40, and the one partition 40 covers the cleaning brush roller 31, the collection roller 32, and the scraping blade 33 in the lower cleaner. In other words, an upper surface of the one partition 40 faces the cleaning brush roller 31, the collection roller 32, and the scraping blade 33 in the upper cleaner, and a lower surface of the one partition 40 faces the cleaning brush roller 31, the collection roller 32, and the scraping blade 33 in the lower cleaner. The above-described structure reduces the size and cost of the cleaning device as compared with the cleaning device including the cleaners each having the ceiling plate and the bottom plate as illustrated in FIG. 8.

The above-described one partition means the partition configured integrally and does not mean a partition configured by multiple separate members. However, the one partition may be configured by connecting or assembling multiple members as long as the multiple members are not separated.

As illustrated in FIG. 3, the partition 40 has a surface 40*a* facing the intermediate transfer belt 11. The surface 40*a* is close to the intermediate transfer belt 11 and defines a part of the opening 350. If the toner dropped from the intermediate transfer belt 11 is accumulated on the surface 40*a*, the accumulated toner may drop or scatter in the image forming apparatus when the cleaner is removed for maintenance or the like. For this reason, the surface 40*a* of the partition 40 in the present embodiment has a shape in which the toner is unlikely to accumulate. Specifically, the surface 40*a* is formed into a surface having no concave portion, such as a convex surface protruding toward the intermediate transfer belt 11 or a flat surface (see FIG. 3). The above-described structure can reduce the toner accumulated on the surface 40*a* and prevent toner from falling and scattering in the image forming apparatus.

Figure 5:
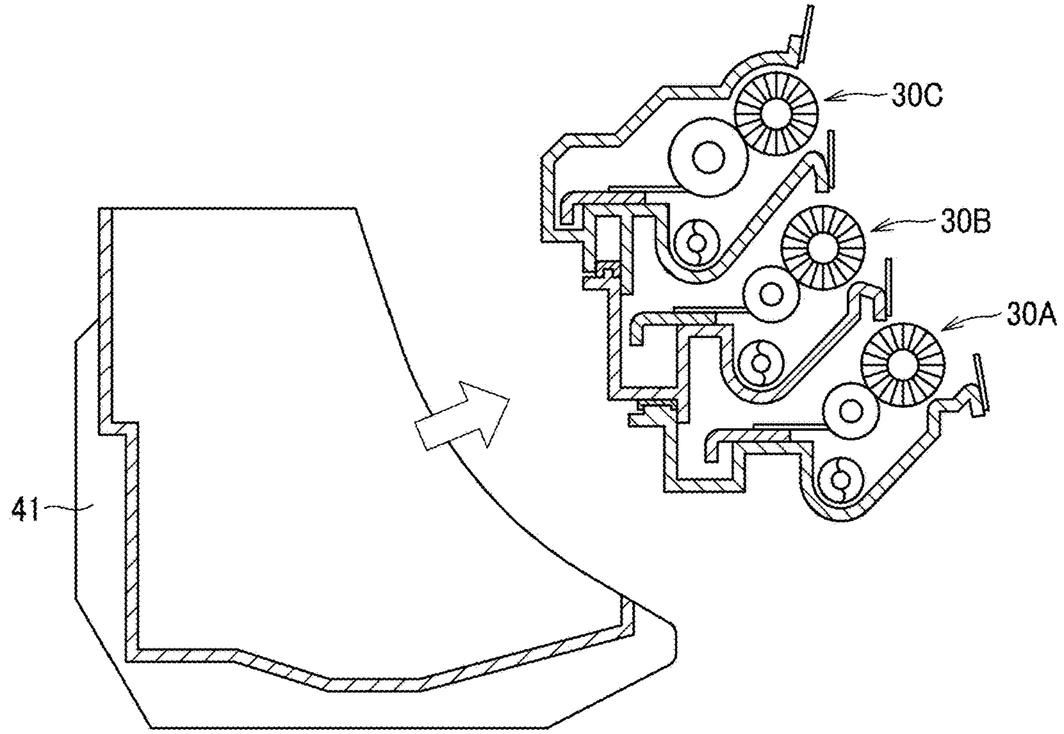
FIG. 5 is a schematic cross-sectional view of a holder and cleaners removed from the holder.

As illustrated in FIG. 5, the multiple cleaners 30A, 30B, and 30C are overlapped with each other to form an integral part that is attachable to and detachable from the holder 41. The cleaners 30A, 30B, and 30C that can be integrally removed from the holder 41 as described above reduce toner scattering from the cleaners 30A, 30B, and 30C. The above-described structure that can remove the vertically overlapped cleaners 30A, 30B, and 30C from the holder 41 enables the cleaner having an upper opening covered by the bottom plate of the other cleaner disposed above the cleaner to attach to and detach from the holder 41. As a result, the above-described structure reduces the toner scattering from the cleaner disposed under the other cleaner.

The cleaners 30A, 30B, and 30C may be configured to be separable from each other. Separating the cleaner 30C from the cleaner 30B opens the upper opening of the cleaner 30B. Similarly, separating the cleaner 30B from the cleaner 30A opens the upper opening of the cleaner 30A. As a result, maintenance work such as cleaning or component replacement in the cleaners 30A and 30B can be easily performed.

Figure 6:
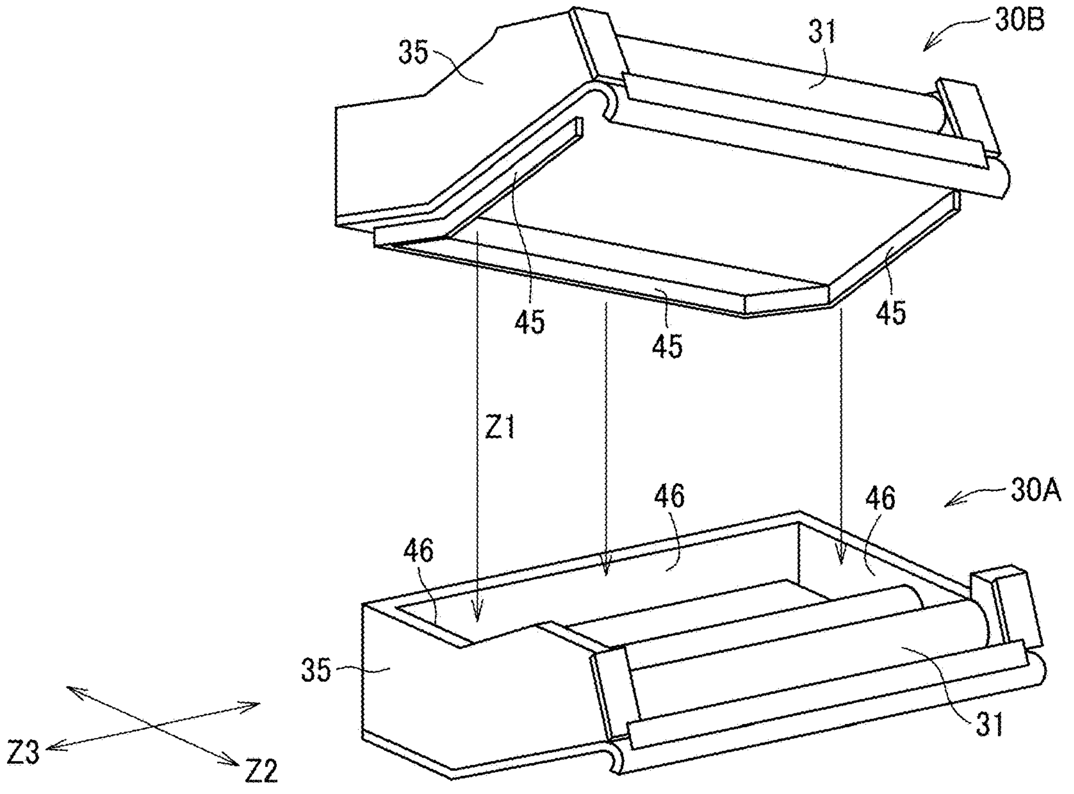
FIG. 6 is a perspective view of cleaners to illustrate a fitting structure between the cleaners.

In the present embodiment, as illustrated in FIG. 6, the upper cleaner 30B and the lower cleaner 30A are configured to be attachable to and detachable from each other. Specifically, the upper cleaner 30B includes a rib 45 serving as a fitting portion on the housing 35, and the housing 35 of the lower cleaner 30A includes an opening frame 46 serving as a fitting portion that can be fitted to the rib 45 of the upper cleaner 30B. The rib 45 projects from the housing 35. The rib 45 projecting downward from the bottom plate of the upper cleaner 30B is inserted into the opening frame 46 disposed at the top of the lower cleaner 30A to fit the cleaners 30A and 30B each other. As a result, the cleaner 30B is assembled to the cleaner 30A. The rib 45 may be disposed on the one partition 40 of the bottom plate of the upper cleaner 30B. Assembling the cleaner 30B to the cleaner 30A restricts displacement of the cleaner 30B in the cleaner 30A in directions indicated by arrows Z2 and Z3 that are illustrated in FIG. 6 and directions intersecting a direction indicated by an arrow Z1. In the direction indicated by the arrow Z1, the cleaner 30B is moved to assemble the cleaner 30B to the cleaner 30A. The above-described structure can prevent the cleaners 30A and 30B from displacing and separating from each other. As a result, the cleaners can be easily attached to and detached from the holder 41. In addition, the above-described structure can reduce the toner scattering from the interval between the cleaners. The assembly structure illustrated in FIG. 6 to assemble the second cleaner 30B to the first cleaner 30A is the same as the assembly structure to assemble the third cleaner 30C to the second cleaner 30B.

Additionally, the cleaning device 10 in the present embodiment includes a seal 47 (see FIG. 3). The seal 47 seals a gap between the rib 45 and the opening frame 46 which are fitted to each other after the cleaners 30A, 30B, and 30C are assembled. The seal 47 may be disposed on the rib 45 or the opening frame 46. The above-described seal 47 sealing the gap between the rib 45 and the opening frame 46 which are fitted to each other can reduce the toner leakage from the fitting portion to the outside. In the present embodiment, the rib 45 is disposed on the inner side of the seal as illustrated in FIG. 3. As a result, the rib 45 functions as a wall that prevents the toner from moving to the seal 47, which reduces the toner leakage.

The above-described embodiments are illustrative and do not limit this disclosure. It is therefore to be understood that within the scope of the appended claims, numerous additional modifications and variations are possible to this disclosure otherwise than as specifically described herein.

In the above, the present disclosure is applied to the belt cleaning device 10 including the three cleaners 30A, 30B, and 30C. However, the cleaning device according to the present disclosure may include two cleaners or four or more cleaners.

The direction in which the cleaners are arranged is not limited to the vertical direction but may be a horizontal direction.

The cleaning device according to the present disclosure is not limited to the belt cleaning device to clean the surface of the intermediate transfer belt as the object to be cleaned. The present disclosure may be applied to various types of cleaning devices such as a cleaning device to clean the surface of a conveyor belt to convey the sheet and a cleaning device to clean the object other than the belt.

The cleaning roller in the cleaner is not limited to the cleaning brush roller as described above and may be a conductive rubber roller. For example, the cleaning rollers in the first cleaner 30A and the second cleaner 30B that are upstream from the third cleaner 30C may be cleaning brush rollers, and the cleaning roller in the third cleaner 30C downstream from the first cleaner 30A and the second cleaner 30B may be the conductive rubber roller.

The present disclosure is not limited to an electrostatic cleaning device as described above embodiment in which a predetermined voltage is applied to the cleaning brush roller to electrostatically remove the residual toner. For example, the present disclosure may be applied to a blade cleaning device in which a cleaning blade made of urethane or the like scrapes off and remove the residual toner.

The electrostatic cleaning device may have the following configuration to prevent a discharge and a leak between the cleaning brush roller and a support supporting the cleaning brush roller.

Figure 7:
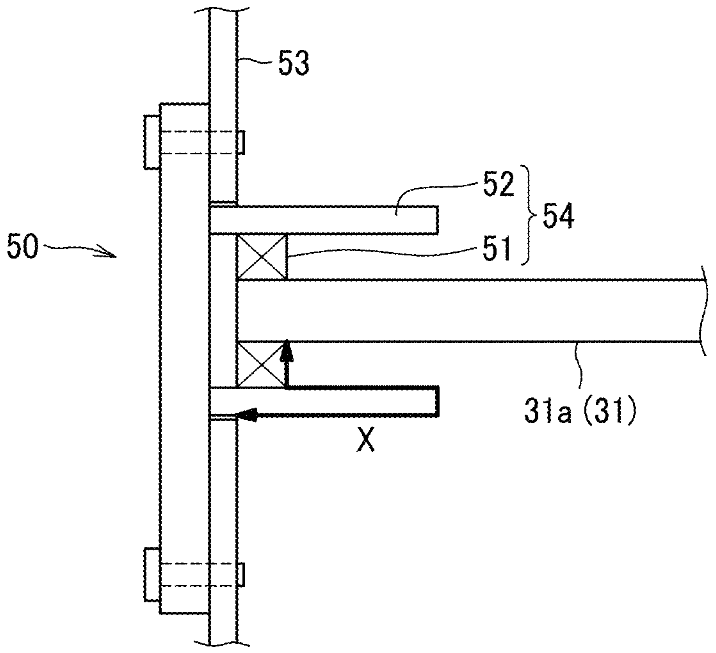
FIG. 7 is an enlarged view of a part of a cleaning brush roller to illustrate a supporting structure of the cleaning brush roller.

In the configuration illustrated in FIG. 7, a support 50 including parts such as a bearing 51 supports a rotation shaft 31*a* of the cleaning brush roller 31. Specifically, the support 50 includes a non-conductive bearing unit 54 and a reinforcing plate 53 made of metal. The reinforcing plate 53 serves as a bearing unit support supporting the bearing unit 54. The bearing unit 54 includes the bearing 51 supporting the rotation shaft 31*a* and a bearing case 52 holding the bearing 51.

Satisfying the following relationship prevents the occurrence of the discharge and the leak in the above-described configuration.

$$X\text{[mm]} \geq Y\text{[kV]} \times 2\ \text{[mm/kV]},$$

where X is a creepage distance [mm] that is the shortest distance along the surfaces of the support 50 from a contact position at which the rotation shaft 31*a* contacts the bearing unit 54 to the reinforcing plate 53 as the bearing unit support, and Y is an absolute value of a voltage [kV] applied to the rotation shaft 31*a* by a power source. In FIG. 7, the creepage distance X is the shortest distance along the surface of the bearing unit 54 from the contact position at which the rotation shaft 31*a* contacts the bearing unit 54 to the reinforcing plate 53. Setting the above-described relationship can prevent the occurrence of the discharge and the leak between the rotation shaft 31*a* and the reinforcing plate 53.

The above-described embodiments of the present disclosure have at least the following aspects.

[First Aspect]

In a first aspect, a cleaning device includes multiple cleaners, a partition, and a holder. The multiple cleaners include a first cleaner and a second cleaner adjacent to the first cleaner. The multiple cleaners each include a cleaning roller to remove a substance adhering to a surface of an object and a housing having an opening to collect the substance. The partition partitions the first cleaner and the second cleaner and defines a part of a wall of each of the first cleaner and the second cleaner. The holder holds the multiple cleaners.

[Second Aspect]

In a second aspect, the partition in the cleaning device according to the first aspect has a surface facing the object, and the surface defines a part of the opening.

[Third Aspect]

In a third aspect, the surface in the cleaning device according to the second aspect has a flat surface or a convex surface.

[Fourth Aspect]

In a fourth aspect, the housing of one of the first cleaner and the second cleaner in the cleaning device according to any one of the first to third aspects includes the partition.

[Fifth Aspect]

In a fifth aspect, the multiple cleaners in the cleaning device according to any one of the first to fourth aspects are overlapped vertically, the second cleaner is disposed above the first cleaner, and the housing of the second cleaner includes the partition as a bottom plate of the second cleaner.

[Sixth Aspect]

In a sixth aspect, each of the first cleaner and the second cleaner in the cleaning device according to the fifth aspect includes a collection roller and a scraping blade. The collection roller collects the substance from the cleaning roller. The scraping blade scrapes the substance from the collection roller. The partition as the bottom plate has a lower surface and an upper surface. The lower surface faces the cleaning roller, the collection roller, and the scraping blade in the first cleaner, and the upper surface faces the cleaning roller, the collection roller, and the scraping blade in the second cleaner.

[Seventh Aspect]

In a seventh aspect, the second cleaner in the cleaning device according to the sixth aspect includes a conveying screw to convey the substance scraped by the scraping blade in an axial direction of the conveying screw, and the conveying screw is disposed above and adjacent to the lowest part of the partition.

[Eighth Aspect]

In an eighth aspect, the second cleaner in the cleaning device according to any one of the fifth to seventh aspects is detachably attached to the first cleaner, the housing of the second cleaner includes a rib projecting from the bottom plate of the partition, and the first cleaner includes a fitting portion into which the rib of the second cleaner is fittable.

[Ninth Aspect]

In a ninth aspect, the cleaning device according to the eighth aspect further includes a seal sealing a gap between the rib and the fitting portion.

[Tenth Aspect]

In a tenth aspect, the multiple cleaners in the cleaning device according to any one of the first to ninth aspects are detachably attached to the holder.

[Eleventh Aspect]

In an eleventh aspect, the second cleaner in the cleaning device according to any one of the first to seventh and the tenth aspects is detachably attached to the first cleaner, the housing of the second cleaner includes a rib projecting from the partition, and the first cleaner includes a fitting portion into which the rib of the second cleaner is fittable.

[Twelfth Aspect]

In a twelfth aspect, the cleaning device according to the eleventh aspect further includes a seal sealing a gap between the rib of the second cleaner and the fitting portion of the first cleaner.

[Thirteenth Aspect]

In a thirteenth aspect, the cleaning device according to any one of the first to twelfth aspects further includes multiple seals contacting the object to seal a gap between the housing and the object. The multiple cleaners further include a most upstream cleaner disposed most upstream of the multiple cleaners in a moving direction in which the object moves and a most downstream cleaner disposed most downstream of the multiple cleaners in the moving direction. The multiple seals include an entrance seal, an outlet seal, and side seals. The entrance seal is on the most upstream of the housing of the most upstream cleaner in the moving direction. The outlet seal is on the most downstream of the housing of the most downstream cleaner in the moving direction. The side seals are on both sides of the housings of the multiple cleaners in a direction orthogonal to the moving direction.

[Fourteenth Aspect]

In a fourteenth aspect, the cleaning device according to any one of the first to thirteenth aspects further includes a first power source and a second power source. The first power source supplies a first voltage having a same polarity as a normal charge polarity of toner contained in the substance. The second power source supplies a second voltage having a polarity opposite to the normal charge polarity of the toner. The second cleaner is disposed downstream from the first cleaner in a direction in which the object moves. The first cleaner includes a first cleaning roller, a first bearing unit, and a first metal support. The first cleaning roller includes a first rotation shaft electrically coupled to the first power source. The first bearing unit supports the first rotation shaft and has a non-conductivity. The first metal support supports the first bearing unit. The second cleaner includes a second cleaning roller, a second bearing unit, and a second metal support. The second cleaning roller includes a second rotation shaft electrically coupled to the second power source. The second bearing unit supports the second rotation shaft and has a non-conductivity. The second metal support supports the second bearing unit. Each of the first cleaner and the second cleaner satisfies a following relationship, $$X[\text{mm}] \geq Y[\text{kV}] \times 2\ [\text{mm/kV}],$$

where X[mm] are creepage distances that are the shortest distances from contact positions at which the first rotation shaft and the second rotation shaft contact the first bearing unit and second bearing unit to the first metal support and the second metal support along surfaces of the first bearing unit and the second bearing unit, respectively, and Y[kV] is an absolute value of a first voltage applied to the first rotation shaft by the first power source or a second voltage applied to the second rotation shaft by the second power source.

[Fifteenth Aspect]

In a fifteenth aspect, an image forming apparatus includes an image forming section to form an image on a recording medium and the cleaning device according to any one of the first to fourteenth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A cleaning device comprising:
multiple cleaners including:
a first cleaner; and
a second cleaner adjacent to the first cleaner, the multiple cleaners each including:
a cleaning roller to remove a substance adhering to a surface of an object; and
a housing having an opening to collect the substance;
a partition partitioning the first cleaner and the second cleaner, the partition defining a part of a wall of each of the first cleaner and the second cleaner; and
a holder holding the multiple cleaners,
wherein the partition including a surface facing the object, the surface of the partition defining a part of the opening.

2. The cleaning device according to claim 1,
wherein the surface has a flat surface or a convex surface.

3. The cleaning device according to claim 1,
wherein the housing of one of the first cleaner and the second cleaner includes the partition.

4. The cleaning device according to claim 3, wherein;
the multiple cleaners are overlapped vertically,
the second cleaner is disposed above the first cleaner, and
the housing of the second cleaner includes the partition as a bottom plate of the second cleaner.

5. The cleaning device according to claim 4,
wherein each of the first cleaner and the second cleaner includes:
a collection roller to collect the substance from the cleaning roller; and
a scraping blade configured to scrape the substance from the collection roller, and
the partition as the bottom plate includes:
a lower surface facing the cleaning roller, the collection roller, and the scraping blade in the first cleaner; and
an upper surface facing the cleaning roller, the collection roller, and the scraping blade in the second cleaner.

6. The cleaning device according to claim 5, wherein;
the second cleaner includes a conveying screw to convey the substance scraped by the scraping blade in an axial direction of the conveying screw, and the conveying screw is disposed above and adjacent to a lowest part of the partition.

7. The cleaning device according to claim 1,
wherein the multiple cleaners are detachably attached to the holder.

8. An image forming apparatus comprising:
an image forming section configured to form an image on a recording medium; and
the cleaning device according to claim 1.

9. A cleaning device comprising:
multiple cleaners including:
a first cleaner; and
a second cleaner adjacent to the first cleaner, the multiple cleaners each including:
a cleaning roller to remove a substance adhering to a surface of an object; and
a housing having an opening to collect the substance;
a partition partitioning the first cleaner and the second cleaner, the partition defining a part of a wall of each of the first cleaner and the second cleaner; and
a holder holding the multiple cleaners,
wherein:
the housing of one of the first cleaner and the second cleaner includes the partition,
the multiple cleaners are overlapped vertically,
the second cleaner is disposed above the first cleaner,
the housing of the second cleaner includes the partition as a bottom plate of the second cleaner,
the second cleaner is detachably attached to the first cleaner,
the housing of the second cleaner includes a rib projecting from the bottom plate, and
the first cleaner includes a fitting portion into which the rib of the second cleaner is fittable.

10. The cleaning device according to claim 9, further comprising;
a seal sealing a gap between the rib and the fitting portion.

11. An image forming apparatus comprising:
an image forming section configured to form an image on a recording medium; and
the cleaning device according to claim 9.

12. A cleaning device comprising:
multiple cleaners including:
a first cleaner; and
a second cleaner adjacent to the first cleaner, the multiple cleaners each including:
a cleaning roller to remove a substance adhering to a surface of an object; and
a housing having an opening to collect the substance;
a partition partitioning the first cleaner and the second cleaner, the partition defining a part of a wall of each of the first cleaner and the second cleaner; and
a holder holding the multiple cleaners,
wherein the second cleaner is configured to be detachably attached to the first cleaner,
the housing of the second cleaner includes a rib projecting from the partition, and
the first cleaner includes a fitting portion into which the rib of the second cleaner is fittable.

13. The cleaning device according to claim 12, further comprising:
a seal sealing a gap between the rib of the second cleaner and the fitting portion of the first cleaner.

14. An image forming apparatus comprising:
an image forming section configured to form an image on a recording medium; and
the cleaning device according to claim 12.

15. A cleaning device comprising:
multiple cleaners including:
a first cleaner; and
a second cleaner adjacent to the first cleaner, the multiple cleaners each including:
a cleaning roller to remove a substance adhering to a surface of an object; and
a housing having an opening to collect the substance;
a partition partitioning the first cleaner and the second cleaner, the partition defining a part of a wall of each of the first cleaner and the second cleaner; and
a holder holding the multiple cleaners,
multiple seals contacting the object to seal a gap between the housing and the object,
wherein the multiple cleaners further include:
a most upstream cleaner disposed most upstream of the multiple cleaners in a moving direction in which the object moves; and
a most downstream cleaner disposed most downstream of the multiple cleaners in the moving direction, and
the multiple seals include:

an entrance seal on the most upstream of the housing of the most upstream cleaner in the moving direction;

an outlet seal on the most downstream of the housing of the most downstream cleaner in the moving direction; and side seals on both sides of the housings of the multiple cleaners in a direction orthogonal to the moving direction.

16. An image forming apparatus comprising:

an image forming section configured to form an image on a recording medium; and the cleaning device according to claim 15.

17. A cleaning device comprising:

multiple cleaners including:

a first cleaner; and a second cleaner adjacent to the first cleaner, the multiple cleaners each including:

a cleaning roller to remove a substance adhering to a surface of an object; and a housing having an opening to collect the substance;

a partition partitioning the first cleaner and the second cleaner, the partition defining a part of a wall of each of the first cleaner and the second cleaner; and a holder holding the multiple cleaners, a first power source configured to supply a first voltage having a same polarity as a normal charge polarity of toner contained in the substance; and a second power source configured to supply a second voltage having a polarity opposite to the normal charge polarity of the toner, wherein the second cleaner is disposed downstream from the first cleaner in a direction in which the object moves, and the first cleaner includes:

a first cleaning roller including a first rotation shaft electrically coupled to the first power source;

a first bearing unit supporting the first rotation shaft and having a non-conductivity; and a first metal support supporting the first bearing unit;

the second cleaner includes:

a second cleaning roller including a second rotation shaft electrically coupled to the second power source;

a second bearing unit supporting the second rotation shaft and having a non-conductivity; and a second metal support supporting the second bearing unit;

each of the first cleaner and the second cleaner satisfies a following relationship, $$X[\text{mm}] \geq Y[\text{kV}] \times 2\ [\text{mm/kV}],$$

where X[mm] are creepage distances that are shortest distances from contact positions at which the first rotation shaft and the second rotation shaft contact the first bearing unit and second bearing unit to the first metal support and the second metal support along surfaces of the first bearing unit and the second bearing unit, respectively, and Y[kV] is an absolute value of a first voltage applied to the first rotation shaft by the first power source or a second voltage applied to the second rotation shaft by the second power source.

18. An image forming apparatus comprising:

an image forming section configured to form an image on a recording medium; and the cleaning device according to claim 17.

* * * * *